United States Patent [19]
Nishio et al.

[11] Patent Number: 5,283,267
[45] Date of Patent: Feb. 1, 1994

[54] POLYPROPYLENE RESIN COMPOSITION

[75] Inventors: Takeyoshi Nishio; Norihisa Tamashima, both of Okazaki; Kouhei Ueno, Sakai; Tomohiko Akagawa, Sakai; Saburo Hinenoya, Sakai; Shinji Katsui, Sakai, all of Japan

[73] Assignee: Ube Industries, Ltd., Japan

[21] Appl. No.: 630,771

[22] Filed: Dec. 21, 1990

Related U.S. Application Data

[63] Continuation of Ser. No. 333,274, May 5, 1989, abandoned.

[30] Foreign Application Priority Data

Apr. 5, 1988 [JP] Japan .................. 63-83701

[51] Int. Cl.$^5$ .............................................. C08K 9/00
[52] U.S. Cl. ................................. 523/216; 524/423; 524/505; 524/451; 524/301; 524/529; 524/394; 524/400; 525/88
[58] Field of Search .......................... 523/216; 524/423

[56] References Cited

U.S. PATENT DOCUMENTS

| | | | |
|---|---|---|---|
| 4,371,662 | 2/1983 | Tone et al. | 525/89 |
| 4,562,230 | 12/1985 | Fukui et al. | 525/78 |
| 4,705,818 | 11/1987 | Kawai et al. | 523/216 |

FOREIGN PATENT DOCUMENTS

| | | | |
|---|---|---|---|
| 53-64257 | 6/1978 | Japan . | |
| 57-051735 | 3/1982 | Japan . | |
| 57-51735 | 3/1982 | Japan . | |
| 58-142921 | 8/1983 | Japan | 524/423 |
| 61-069848 | 4/1986 | Japan . | |
| 61-69848 | 4/1986 | Japan . | |
| 62-91545 | 4/1987 | Japan . | |
| 31-122752 | 5/1988 | Japan | 524/394 |

Primary Examiner—Melvyn I. Marquis
Assistant Examiner—Mark D. Sweet
Attorney, Agent, or Firm—Parkhurst, Wendel & Rossi

[57] ABSTRACT

The polypropylene resin composition of the present invention comprises specific proportions of a crystalline ethylene-propylene block copolymer, an hydrogenated block copolymer, an amorphous ethylene-propylene copolymer, surface-treated talc, fibrous magnesium oxysulfate of granular form and a metal soap. This resin composition is well balanced in rigidity and impact resistance, has good mar resistance, and can be preferably used in large-sized parts for automobiles, particularly instrument panels for automobiles.

16 Claims, No Drawings

POLYPROPYLENE RESIN COMPOSITION

This is a continuation of application Ser. No. 07/333,274, filed Apr. 5, 1989, now abandoned.

BACKGROUND OF THE INVENTION AND RELATED ART STATEMENT

The present invention relates to a polypropylene resin composition and more particularly to a polypropylene resin composition which is composed mainly of a crystalline ethylene-propylene copolymer, has excellent moldability and can provide a molded article of good balance particularly in rigidity and impact resistance, good mechanical properties and excellent appearance Said polypropylene resin composition can be utilized in large-sized parts for automobiles, particularly instrument panels for automobiles.

Crystalline polypropylene is in use in various molded articles in which physical properties such as rigidity, resistance to heat deformation and the like are required. However, having insufficient low temperature properties and being a non-polar highly-crystalline polymer, crystalline polypropylene has poor impact resistance and poor coatability and cannot be used in applications in which rigidity, resistance to heat deformation, impact resistance and coatability are required together In order to improve the impact resistance and coatability of crystalline polypropylene, there have been proposed, for example, a polypropylene composition which is a blend of a crystalline ethylene-propylene block copolymer as a crystalline polypropylene with an amorphous ethylene-propylene copolymer, and a polypropylene composition which is a blend of crystalline ethylene-propylene block copolymer, an amorphous ethylene-propylene copolymer and various polyethylenes.

In these polypropylene compositions, however, the rigidity, resistance to heat deformation, and the like inherently possessed by crystalline ethylene-propylene block copolymers are reduced.

In order to improve the drawbacks of the above polypropylene compositions, Japanese Patent Application Kokai (Laid-Open) No.53-64257 describes an invention titled "Impact-resistant Resin Composition". The document discloses a resin composition with improved low temperature impact resistance, comprising a crystalline ethylene-propylene block copolymer, an amorphous ethylene-α-olefin copolymer and talc. The document describes that the resin composition, as compared with conventional crystalline ethylene-propylene block copolymers, is substantially improved in low temperature impact resistance, rigidity and coatability, and provides Examples for supporting the description. The above composition, however, is insufficient in rigidity-impact resistance, balance and appearance. Consequently, the molded article obtained from the composition is unsuitable for use in applications such as parts for automobiles, particularly instrument panels where mechanical properties and appearance are required, although the article can find limited applications where appearance is negligible.

There have also been disclosed various polypropylene compositions comprising, as a filler other than talc, a granular filler (e.g. calcium carbonate) or a fibrous filler (e.g. glass fiber). However, in the polypropylene compositions comprising a granular filler, the molded articles have in sufficient rigidity; and in the polypropylene compositions comprising a fibrous filler, although the rigidity is improved significantly, the impact resistance is low and the molded articles have poor surface appearance and give rise to warpage and, deformation. For example, Japanese Patent Application Kokai (Laid-Open) No. 62-91545 proposes a polyolefin resin composition comprising a polyolefin, a thermoplastic elastomer, a fibrous reinforcing agent, talc and calcium carbonate. This composition, however, tends to yield poor appearance (e.g. silver streaking) during injection molding and has a small improvement in rigidity because it contains calcium carbonate. Japanese Patent Application Kokai (Laid-Open) No. 61-69848 proposes a polypropylene resin composition comprising a polypropylene resin, a fibrous filler, talc and an elastomer. This composition, however, causes deformation when molded into large-sized parts for automobiles because it contains a large amount of a fibrous filler.

Japanese Patent Application No. 62-324396 proposes a polypropylene resin composition comprising a crystalline ethylene-propylene block copolymer, an amorphous ethylene-propylene copolymer, talc and fibrous magnesium oxysulfate. The composition has insufficient rigidity and is improper for use in large-sized parts for automobiles.

The technique of compounding an olefinic resin and a hydrogenated block copolymer as used in the present invention to obtain a composition was already proposed in, for example, Japanese Patent Application Kokai (Laid-Open) Nos. 58-206644, 58-215446, 59-223745, 60-166339, 61-28547, 61-28548, 61-34047 and 61-34048. All of the compositions proposed in these documents contain large amounts of a hydrogenated block copolymer and a softening agent and consequently have low rigidity. In these compositions, even if the amount of the hydrogenated block copolymer is reduced to increase the rigidity, the tensile elongation is decreased.

Japanese Patent Application Kokai (Laid-Open) No. 57-51735 proposes a composition comprising a crystalline ethylene-propylene block copolymer, a hydrogenated block copolymer and an amorphous ethylene-propylene copolymer as used in the present invention. This composition, however, contains no inorganic filler and has low resistance to heat deformation and low rigidity. Therefore, the composition cannot achieve the object of the present invention.

Thus, the hitherto known polypropylene resin compositions mentioned above have been unable to provide a molded article having good balance in rigidity and impact strength, good mechanical properties, excellent appearance and good moldability and have found no use in, for example, large-sized parts for automobiles, particularly instrument panels.

OBJECT AND SUMMARY OF THE INVENTION

The object of the present invention is to provide a polypropylene resin composition which can give a molded article having good balance in rigidity and impact strength good mechanical properties and excellent appearance.

The present inventors made a study in order to achieve the above object. As a result, it was found that the above object can be achieved by compounding a particular crystalline ethylene propylene block copolymer, an hydrogenated block copolymer, an amorphous ethylene-propylene copolymer, fibrous magnesium oxysulfate of granular form, surface-treated talc and a metal soap at specific proportions to obtain a composition.

This finding has led to the completion of the present invention.

The present invention provides a polypropylene resin composition for use in instrument panels, comprising (A) a crystalline ethylene-propylene block copolymer of 57-79% by weight based on the total amount of components (A), (B), (C), (D) and (E), whose ethylene content is 4-10% by weight, whose polypropylene component contains a boiling n-heptane insoluble of at least 95% by weight, whose p-xylene soluble at normal temperature has an intrinsic viscosity of at least 2 as measured in decalin at 135° C., and whose melt flow index is 3-30 g/10 min, (B) a hydrogenated block copolymer obtained by hydrogenating a block copolymer consisting of two terminal blocks which are an aromatic vinyl compound polymer and occupy 10-40% by weight of the copolymer and an intermediate block which is a conjugated diene polymer and occupies 90-60% by weight of the copolymer, to a state that the two terminal blocks and the intermediate block are hydrogenated in proportions of 10% or less and 90% or more, respectively, (C) an amorphous ethylene-propylene copolymer having a Mooney viscosity $ML_{1+4}$ (100° C.) of 40-100, the total amount of the components (B) and (C) being 5-15% by weight based on the total amount of the components (A) to (E) and the weight ratio of the components (B) to (C) being 80/20 to 20/80, (D) surface-treated talc of 15-25% by weight based on the total amount of the components (A) to (E), having an average particle diameter of 0.5-2.5 μm, (E) fibrous magnesium oxysulfate of granular form of 1-3% by weight based on the components (A) to (E), having a fiber diameter of 0.1-1.5 μm and an aspect ratio of 70-150, and (F) 0.2-0.5 part by weight, based on 100 parts by weight of the total of the components (A) to (E), of a metal soap.

In the present invention, a crystalline ethylene-propylene block copolymer is mixed with an hydrogenated block copolymer, an amorphous ethylene-propylene copolymer, a surface-treated inorganic filler and a particular fibrous filler to obtain a polypropylene resin composition which can provide a molded article with improved balance in rigidity and impact resistance, excellent coatability and excellent appearance. Therefore, the present composition is entirely different from resin compositions comprising an olefinic resin and a hydrogenated block copolymer, as proposed in, for example, Japanese Papanese Patent Application Kokai (Laid-Open) No. 58-206644.

DETAILED DESCRIPTION OF THE INVENTION

The present invention is described in detail below.

Component (A)

The component (A) of the polypropylene resin composition of the present invention is a crystalline ethylene propylene block copolymer whose ethylene content is 4-10% by weight, preferably 5-8% by weight, whose polypropylene component contains a boiling n-heptane insoluble of at least 95% by weight, preferably at least 97% by weight, whose p-xylene soluble at normal temperature (the soluble consists of an amorphous ethylene-propylene copolymer and a low-molecular polymer) has an intrinsic viscosity of at least 2, preferably at least 3.5 as measured in decalin at 135° C., and whose melt flow index is 3-30 g/10 min, preferably 3-10 g/10 min.

The above polypropylene component refers to the crystalline polypropylene (also referred to as the matrix, in some cases) used in the block copolymerization reaction to obtain the component (A).

When the polypropylene component of the crystalline ethylene-propylene block copolymer contains a boiling n-heptane insoluble in an amount of less than 95% by weight, the resulting polypropylene resin composition gives a molded article of small flexural modulus. When the p-xylene soluble at normal temperature, of the crystalline ethylene-propylene block copolymer has an intrinsic viscosity of less than 2 as measured in decalin at 135° C., the resulting polypropylene resin composition gives a molded article of low Izod impact strength at −30° C. When the melt flow index of the crystalline ethylene-propylene block copolymer is less than 3 g/10 min, the resulting polypropylene resin composition has poor moldability and gives a molded article of poor appearance. When the melt flow index is more than 30 g/10 min, the polypropylene resin composition gives a molded article of low impact resistance. In such cases, the polypropylene resin composition cannot be used as a material for molded articles in which rigidity, resistance to heat deformation, low temperature impact resistance and good appearance are all required.

The crystalline ethylene-propylene block copolymer is contained in the composition of the present invention excluding the metal soap in an amount of 57-79% by weight, preferably 63-76% by weight. When the content of this component is less than 57% by weight, the resulting polypropylene resin composition gives a molded article of small flexural modulus. When the content is more than ₁ % by weight, the resulting polypropylene resin composition gives a molded article of small Izod impact strength at −30° C. The crystalline ethylene-propylene block copolymer may be used in combination of two or more as long as the total content is in the above range. As long as the object of the present invention is attained, there may also be used a modified crystalline ethylene-propylene block copolymer obtained by grafting a crystalline ethylene-propylene block copolymer with an unsaturated organic acid or its derivative.

Component (B)

The hydrogenated block copolymer which is the component (B) of the present polypropylene resin composition is obtained by hydrogenating a base block copolymer consisting of (a) an intermediate block which is a conjugated diene polymer and occupies 90-60% by weight of the copolymer and (b) two terminal blocks which are an aromatic vinyl compound polymer and occupy 10-40% of the copolymer. As the aromatic vinyl compound polymer constituting the two terminal blocks, there can be mentioned styrene polymers such as styrene polymer, α-methylstyrene polymer, chlorostyrene polymer and the like. Their molecular weight is preferably 5,000-14,000 in terms of number-average molecular weight. Of the above polymers, the styrene polymer is particularly preferable. As the conjugated diene polymer constituting the intermediate block, there can be used polymers of butadiene, isoprene, chloroprene, and the like. Their molecular weight is preferably 10,000-300,000 in terms of number-average molecular weight. Of the above polymers, the butadiene polymer is particularly preferable. When the two terminal blocks occupy less than 10% by weight of the block copolymer, the resulting polypropylene resin composition gives a molded article of insufficient hardness and insufficient strength. When the two terminal blocks occupy more than 40% by weight of the block copolymer, the polypropylene resin composition gives a molded article of insufficient impact resistance. The amount of the two terminal blocks in the block copolymer is preferably 15-25% by weight.

The hydrogenated block copolymer used in the present polypropylene resin composition can be obtained by hydrogenating the above block copolymer. During the hydrogenation, the two terminal blocks of the block copolymer are hydrogenated in a proportion of 10% or less and the intermediate block is hydrogenated in a proportion of 90% or more. In particular, the hydrogenation proportion of the intermediate block is preferably 95% or more. When the hydrogenation proportion is less than 90%, the resulting polypropylene resin composition has reduced weather resistance. When the intermediate block is a polybutadiene, the hydrogenated intermediate block has an ethylene-butylene copolymer structure; and when the intermediate block is a polyisoprene, the hydrogenated intermediate block has an ethylene-propylene copolymer structure.

Incidentally, the hydrogenated block copolymer used in the present polypropylene resin composition can be easily available under a brand name of Kraton G (a product of Shell Chemical).

Component (C)

The amorphous ethylene-propylene copolymer which is the component (c) of the present polypropylene resin composition has a Mooney viscosity $ML_{1+4}$ (100° C.) of 40-100, preferably 50-80. When the Mooney viscosity is less than 40, the resulting polypropylene resin composition gives a molded article of low rigidity, low impact resistance at low temperatures and poor appearance. When the Mooney viscosity is more than 100, it is difficult to obtain a composition of uniform dispersion by kneading and the resulting composition has low impact resistance. The amorphous ethylene-propylene copolymer (C) may be a diene-containing terpolymer as long as the object of the present invention is attained.

The components (B) and (C) are contained in the polypropylene resin composition excluding the component (F) which is a metal soap, in an amount of 5-15% by weight, preferably 7-12% by weight. When the amount is more than 15% by weight, the resulting composition has insufficient rigidity and low mar resistance. When the amount is less than 5% by weight, the composition has low impact resistance.

The weight ratio of the component (B) to the component (C) is 80/20 to 20/80, preferably 70/30 to 30/70.

When the weight ratio exceeds 80/20, the resulting polypropylene resin composition has low impact resistance and poor appearance. When the weight ratio is less than 20/80, the composition has poor balance in rigidity and impact resistance.

Component (D)

The talc used in the composition of the present invention is required to have an average particle diameter of 0.5-2.5 μm, preferably 1.5-2.2 μm. When the average particle diameter is less than 0.5 μm, the dispersibility of talc in the composition is poor. When the average particle diameter is more than 2.5 μm, the resulting composition gives a molded article of low impact resistance. The talc is contained in the composition excluding the metal soap in an amount of 15-25% by weight, preferably 16-22% by weight. When the amount is less than 15% by weight, the resulting composition gives a molded article of insufficient rigidity When the amount is more than 25% by weight, the composition gives a molded article of poor appearance.

The talc used in the present composition is surface-treated with various surface-treating agents. The surface treatment includes, for example, chemical or physical surface treatment by a surface-treating agent such as higher alcohol, higher fatty acid, diester, fatty acid metal salt, unsaturated organic acid or its derivative (e.g. maleic anhydride, acrylic acid), silane coupling agent, organic titanate, resin acid, polyethylene glycol ether and the like. The surface-treating agent is preferably a higher alcohol or a higher fatty acid.

The surface-treating agent is used in an amount of 0.2-3%, preferably 0.5-1.5% based on talc. When the amount is more than 3%, a gas is generated during kneading, making the kneading difficult, and the resulting composition has low rigidity. When the amount is less than 0.2%, the resulting composition gives a molded article of poor appearance.

Component (E)

The fibrous magnesium oxysulfate of granular form which is the component (E) of the present composition is required to have a fiber diameter of 0.1-1.5 μm, preferably 0.1-0.7 μm and an aspect ratio of 70-150, preferably 90-130. When the fiber diameter is less than 0.1 μm, the resulting composition gives a molded article of insufficient rigidity. When the fiber diameter is more than 1.5 μm, the molded article produced from the resulting composition causes deformation. When the aspect ratio is less than 70, the resulting molded article has insufficient rigidity When the ratio is more than 150, the molded article causes deformation.

It is necessary that the component (E) have a granular form. The conventional fibrous magnesium oxysulfate is cotton-like and has poor dispersibility when kneaded with the components of the present composition other than the component (E); therefore, it has a small aspect ratio in the resulting composition, allowing the composition to have insufficient rigidity.

The fibrous magnesium oxysulfate of granular form is produced as follows.

Magnesium hydroxide and sulfuric acid are dispersed in water in a slurry state. The dispersion is subjected to a hydrothermal reaction at 160° C. for 24 hours in a pressure container. After the reaction, the reaction mixture is washed with water and then filtered through a 100-mesh wire net. The filtrate is dehydrated to a water content of about 65-80% by weight. The resulting cake is pelletized and made into a columnar form ordinarily having a diameter of 1 to 5 mm and a length of 1 to 20 mm and dried to a water content of less than 1% by weight to obtain fibrous magnesium oxysulfate of granular form.

The fibrous magnesium oxysulfate of granular form is contained in the composition of the present invention excluding the metal soap in an amount of 1-3% by weight, preferably 1.5-2.5% by weight.

When the amount is less than 1 % by weight, the resulting molded article has insufficient rigidity. When the amount is more than 3% by weight, the molded article causes deformation.

Compounding.

It is necessary in the present invention to add, at the time of melt-kneading the components (A), (B), (C), (D) and (E), 0.2-0.5 part by weight, preferably 0.2-0.4 part by weight, based on 100 parts by weight of the total of the components (A), (B), (C), (D) and (E), of a metal soap to these components. When the amount of the metal soap added deviates from the above range, the molded article of the resulting composition has low rigidity.

The metal soap which is component (F) of the present composition can be various metal salts of higher fatty acids represented by $M(OOCR)_n$ wherein M is calcium, barium, magnesium, zinc or the like and RCOO is a residue of stearic acid, lauric acid, octylic acid or the like. Specific examples of the metal soap are magnesium stearate, calcium stearate and zinc laurate.

In order to obtain the polypropylene resin composition of the present invention, it is preferable to knead the components (A), (B), (C), (D), (E) and (F) using an extruder such as high speed double-shaft extruder, multi-vented double-shaft extruder, single-shaft extruder or the like. When a high speed double-shaft extruder is used, only the component (E) is added at an inlet of the single-shaft extruder portion when a multi-vented double-shaft extruder is used, only the component (E) is side-feeded. Thus, an appropriate kneading method must be employed in order not to reduce the aspect ratio of the fiber.

In order for the molded article produced from the polypropylene resin composition of the present invention to have higher capability, it is possible to add, during or after the compounding of the individual components, an antioxidant, an ultraviolet absorber,, a flame retardant, an antistatic agent, a pigment, and the like.

As described above, the polypropylene resin composition of the present invention for use in instrument panels can be obtained by compounding a particular crystalline ethylene-propylene block copolymer, an hydrogenated block copolymer, an amorphous ethylene propylene copolymer, a particular talc and a particular fibrous magnesium oxysulfate of granular form and, at the time of melt-kneading them, adding a particular metal soap, and the molded article produced from this composition has a good balance in rigidity and impact resistance and good mar resistance and can suitably be used in large-sized parts for automobiles, particularly instrument panels for automobiles.

EXAMPLES

The present invention is described in more detail below by way of Examples and Comparative Examples.

EXAMPLES 1–4 AND COMPARATIVE EXAMPLES 1–9

The components shown in Table 1 below were mixed with 0.2 part by weight of a phenol type antioxidant. The mixture was subjected to kneading and pelletization at 230° C. using a high speed double-shaft extruder. In this case, only the fibrous filler was added at an inlet of the single-shaft portion of the extruder via a metering feeder. After the kneading and pelletization, the resulting pellets were molded into test pieces by an injection molder, and the test pieces were evaluated for properties according to the following test methods. The results are shown in Table 1.

(1) Izod impact strength
Measured according to ASTM D 256.
(2) Flexural modulus
Measured according to ASTM D 2853.
(3) Mar resistance
A resin composition was injection-molded into a sheet (100 mm × 100 mm × 3 mm (thickness)) having a leather grain pattern. The sheet was placed on a horizontal plate; a 100-yen coin was vertically placed on the sheet (the side of the coin was contacted with the sheet); the coin was moved on the sheet back and forth at a speed of 50 mm/sec with a force of 3 kg applied to the coin to rub the sheet; the degree of whitening of the rubbed part of the sheet was visually examined according to the following evaluation criterion.

○: The whitening of the rubbed part of the sheet is not seen.
Δ: The whitening of the rubbed part of the sheet is seen but not striking.
X: The whitening of the rubbed part of the sheet is striking.

(4) Appearance
The surface of each test piece was visually observed.
○: There is seen neither silver streaking nor flow mark, and the appearance is good.
X: Silver streaking or flow marks are seen, and the appearance is poor.

(5) Deformation
A resin composition was injection-molded into a mirror surface disc of 100 mm (diameter) × 1.6 mm (thickness). In 48 hours after the molding, the disc was placed on a horizontal plate; a desired point of the circumference was pressed down; and the height from the horizontal plate, of a point which gave the biggest rise due to the pressing was measured.

The components used in compounding each composition were as follows.

(A-1) A crystalline ethylene-propylene block copolymer whose ethylene content is 7.0% by weight, whose polypropylene component contains a boiling n-heptane insoluble of 97.7% by weight, whose p-xylene soluble at normal temperature has an intrinsic viscosity of 4.6, and whose melt flow index is 3 g/10 min.

(A 2) A crystalline ethylene-propylene block copolymer whose ethylene content is 6.8% by weight, whose polypropylene component contains a boiling n-heptane insoluble of 97.1% by weight, whose p-xylene soluble at normal temperature has an intrinsic viscosity of 4.4, and whose melt flow index is 9 g/10 min.

(A-3) A crystalline ethylene-propylene block copolymer which is the same as (A-1) except that the polypropylene component contains a boiling n-heptane insoluble of 94.0% by weight.

(A-4) A crystalline ethylene-propylene block copolymer which is the same as (A-2) except that the polypropylene component contains a boiling n-heptane insoluble of 92.2% by weight.

(B) Kraton G 1650, a product of Shell Chemical (an hydrogenated block copolymer).

(C-1) An amorphous ethylene-propylene copolymer having a Mooney viscosity $ML_{1+4}$ (100° C.) of 69.

(C-2) An amorphous ethylene-propylene copolymer having a Mooney viscosity $ML_{1+4}$ (100° C.) of 18.

(D-1) Talc having an average particle diameter of 1.9 μm, which is surface-treated with a mixture of stearic acid and stearyl alcohol.

(D-2) Talc having an average particle diameter of 1.9 μm, which is not surface-treated.

(E-1) Fibrous magnesium oxysulfate of granular form, having an average fiber diameter of 0.3 μm, and an aspect ratio of 100. Each granule has a columnar form of about 2.5 mm in average diameter and about 3.0 mm in average length.

(E-2) Fibrous magnesium oxysulfate of cotton form, having an average fiber diameter of 0.3 μm and an aspect ratio of 100.

As is clear from Table 1, all of the compositions of Examples 1–4 according to the present invention were of good quality and had a good balance of rigidity and impact resistance, good mar resistance and good appearance. In contrast, the compositions of Comparative Examples 1–9 were defective in at least the mechanical properties, mar resistance and appearance.

TABLE 1

|  |  | Unit | Examples | | | | Comparative Examples | | |
|---|---|---|---|---|---|---|---|---|---|
|  |  |  | 1 | 2 | 3 | 4 | 1 | 2 | 3 |
| Crystalline ethylene- | (A-1) | wt % | 36 | 31 | 38 | 36.5 | — | 36 | 36 |
| propylene block copolymer | (A-2) | wt % | 36 | 33 | 31 | 38 | — | 36 | 36 |
|  | (A-3) | wt % | — | — | — | — | 36 | — | — |
|  | (A-4) | wt % | — | — | — | — | 36 | — | — |
| Hydrogenated block co-polymer | (B) | wt % | 4 | 5 | 4 | 5 | 4 | 0 | 4 |
| Amorphous ethylene- | (C-1) | wt % | 4 | 6.5 | 5 | 2 | 4 | 8 | — |
| propylene copolymer | (C-2) | wt % | — | — | — | — | — | — | 4 |
| Surface-treated talc | (D-1) | wt % | 18 | 22 | 20 | 17 | 18 | 18 | 18 |
| Non-treated talc | (D-2) | wt % | — | — | — | — | — | — | — |
| Fibrous magnesium oxysulfate of granular form | (E-1) | wt % | 2 | 2.5 | 2 | 1.5 | 2 | 2 | 2 |
| Fibrous magnesium oxysulfate of cotton-like form | (E-2) | wt % | — | — | — | — | — | — | — |
| Magnesium stearate |  | PHR[1] | 0.3 | 0.35 | 0.3 | 0.2 | 0.3 | 0.3 | 0.3 |
| Izod Impact strength | 23° C. | kg·cm/cm | 40 | 43 | 41 | 45 | 41 | 35 | 35 |
|  | −30° C. | kg·cm/cm | 5.0 | 5.3 | 5.1 | 4.8 | 5.0 | 4.9 | 4.5 |
| Flexural modulus |  | kg/cm | 29,500 | 28,500 | 29,300 | 29,000 | 28,000 | 27,800 | 28,000 |
| Balance in physical properties |  | ○ (good) X (not good) | ○ | ○ | ○ | ○ | X | X | X |
| Mar resistance |  | ○, Δ, X | ○ | ○ | ○ | ○ | ○ | ○ | ○ |
| Appearance of molded article |  | ○, X | ○ | ○ | ○ | ○ | ○ | ○ | X |
| Deformation |  | mm | 0 | 0 | 0 | 0 | 0 | 0 | 0 |
| Overall evaluation |  | ○ (good) X (not good) | ○ | ○ | ○ | ○ | X | X | X |

|  |  | Unit | Comparative Examples | | | | | |
|---|---|---|---|---|---|---|---|---|
|  |  |  | 4 | 5 | 6 | 7 | 8 | 9 |
| Crystalline ethylene- | (A-1) | wt % | 36 | 31 | 36 | 36 | 38 | 38 |
| propylene block copolymer | (A-2) | wt % | 36 | 33 | 36 | 36 | 31 | 31 |
|  | (A-3) | wt % | — | — | — | — | — | — |
|  | (A-4) | wt % | — | — | — | — | — | — |
| Hydrogenated block co-polymer | (B) | wt % | 2 | 5 | 4 | 4 | 4 | 9 |
| Amorphous ethylene- | (C-1) | wt % | 2 | 6.5 | 4 | 4 | 5 | — |
| propylene copolymer | (C-2) | wt % | — | — | — | — | — | — |
| Surface-treated talc | (D-1) | wt % | 17 | — | 30 | 18 | 20 | 20 |
| Non-treated talc | (D-2) | wt % | — | 22 | — | — | — | — |
| Fibrous magnesium oxysulfate of granular form | (E-1) | wt % | 3 | 2.5 | 2 | — | 5 | 2 |
| Fibrous magnesium oxysulfate of cotton-like form | (E-2) | wt % | — | — | — | 2 | — | — |
| Magnesium stearate |  | PHR[1] | 0.4 | 0.35 | 0.3 | 0.3 | 0.3 | 0.3 |
| Izod Impact strength | 23° C. | kg·cm/cm | 20 | 40 | 25 | 32 | 27 | 45 |
|  | −30° C. | kg·cm/cm | 2.5 | 5.2 | 2.8 | 4.8 | 3.2 | 4.5 |
| Flexural modulus |  | kg/cm | 31,500 | 29,000 | 31,000 | 27,500 | 31,200 | 29,800 |
| Balance in physical properties |  | ○ (good) X (not good) | X | ○ | X | X | X | ○ |
| Mar resistance |  | ○, Δ, X | ○ | X | X | ○ | ○ | ○ |
| Appearance of molded article |  | ○, X | ○ | X | X | ○ | ○ | X |
| Deformation |  | mm | 0 | 0 | 0 | 0 | 1.5 | 0 |
| Overall evaluation |  | ○ (good) X (not good) | X | X | X | X | X | X |

[1]PHR: parts per hundred

What is claimed is:

1. A polypropylene resin composition comprising
(A) a crystalline ethylene-propylene block copolymer of 57–79% by weight based on the total amount of components (A), (B), (C), (D) and (E), whose ethylene content is 4–10% by weight, whose polypropylene component contains a boiling n-heptane insoluble of at least 95% by weight, whose p-xylene soluble at normal temperature has an intrinsic viscosity of at least 2 as measured in decalin at 135° C., and whose melt flow index is 3–30 g/10 min, (B) an hydrogenated block copolymer obtained by hydrogenating a block copolymer consisting of two terminal blocks which are an aromatic vinyl compound polymer and occupy 10–40% by weight of the copolymer and an intermediate block which is a conjugated diene polymer and occupies 90–60% by weight of the copolymer, to a state that the two terminal blocks and the intermediate block are hydrogenated in proportions of 10% or less and 90% or more, respectively, (C) an amorphous ethylene-propylene copolymer having a Mooney viscosity $ML_{1+4}$ (100° C.) of 40–100,
the total amount of the components (B) and (C) being 515% by weight based on the total amount of the components (A) to (E) and the weight ratio of the components (B) to (C) being 80/20 to 20/80, (D) surface-treated talc of 15-25% by weight based on the total amount of the components (A) to (E), having an average particle diameter of 0.5-2.5 μm, (E) fibrous magnesium oxysulfate of granular form of 1-3% by weight based on the components (A) to (E), having a fiber diameter of 0.1-1.5 μm and an aspect ratio of 70-150, and (F) 0.2-0.5 part by weight, based on 100 parts by weight of the total of the components (A) to (E), of a metal soap.

2. A polypropylene resin composition according to claim 1, wherein the amount of the component (A) is 63-76% by weight, the total amount of the components (B) and (C) is 7-12% by weight, the weight ratio of the component (B) to the component (C) is 70/30 to 30/70, the amount of the component (D) is 16-22% by weight, the amount of the component (E) is 1.5-2.5% by weight and the amount of the component (F) is 0.2-0.4 part by weight based on 100 parts by weight of the total amount of the components (A) to (E).

3. A polypropylene resin composition according to claim 1, wherein the boiling n-heptane insoluble of the polypropylene component of the component (A) is at least 97% by weight.

4. A polypropylene resin composition according to claim 1, wherein the intrinsic viscosity of the p-xylene soluble at normal temperature of the component (A) is at least 3.5 as measured in decalin at 135° C.

5. A polypropylene resin composition according to claim 1, wherein the melt flow index of the component (A) is 3-10 g/10 min.

6. A polypropylene resin composition according to claim 1, wherein the Mooney viscosity $ML_{1+4}(100° C.)$ of the component (C) is 50-80.

7. A polypropylene resin composition according to claim 1, wherein the average particle diameter of the component (D) is 1.5-2.2 μm.

8. A polypropylene resin composition according to claim 1, wherein the talc of the component (D) is surface-treated with a higher alcohol, a higher fatty acid, a diester, a fatty acid metal salt, an unsaturated organic acid or its derivative, a silane coupling agent, an organic titanate, a resin acid and/or a polyethylene glycol ether.

9. A polypropylene resin composition according to claim 8, wherein the talc of the component (D) is surface-treated with a mixture of a higher alcohol and a higher fatty acid 10. A polypropylene resin composition according to claim 9, wherein the mixture consists of stearyl alcohol and stearic acid 11. A polypropylene resin composition according to claim 1, wherein the fiber diameter of the component (E) is 0.1-0.7 μm.

12. A polypropylene resin composition according to claim 1, wherein the aspect ratio of the component (E) is 90-130.

13. A polypropylene resin composition according to claim 1, wherein the fibrous magnesium oxysulfate of granular form of the component (E) is produced by subjecting an aqueous slurry of magnesium hydroxide and sulfuric acid to a hydrothermal reaction, filtering the reaction mixture through a 100-mesh wire net, dehydrating the filtrate, passing the resulting cake through a pelletizer and drying the pellets.

14. A polypropylene resin composition according to claim 1, wherein the metal soap of the component (F) is a calcium, barium, magnesium or zinc salt of stearic acid, lauric acid or octylic acid.

15. A polypropylene resin composition according to claim 14, wherein the metal soap is magnesium stearate, calcium stearate or zinc laurate.

16. An automobile instrument panel comprising a polypropylene resin composition according to either of claims 1 or 2.

* * * * *